US006182372B1

United States Patent
Lamm (10) Patent No.: US 6,182,372 B1
(45) Date of Patent: Feb. 6, 2001

(54) INTERPOLATION USING DIGITAL MEANS FOR RANGE FINDINGS IN A TOTAL STATION

(75) Inventor: Robert Lamm, Mountain View, CA (US)

(73) Assignee: Trimble Navigation Limited, Sunnyvale, CA (US)

( * ) Notice: Under 35 U.S.C. 154(b), the term of this patent shall be extended for 0 days.

(21) Appl. No.: 09/139,535

(22) Filed: Aug. 25, 1998

(51) Int. Cl.$^7$ ................................................. G01C 5/00
(52) U.S. Cl. .................................. 33/290; 33/294; 33/293
(58) Field of Search ............................. 33/284, 290, 293, 33/294, 286; 368/118

(56) References Cited

U.S. PATENT DOCUMENTS

| | | | | |
|---|---|---|---|---|
| 4,620,788 | * | 11/1986 | Giger | 356/5 |
| 4,820,041 | * | 4/1989 | Davidson et al. | 33/293 |
| 5,313,409 | * | 5/1994 | Wiklund et al. | 33/290 |
| 5,519,642 | * | 5/1996 | Kishimoto | 33/284 |
| 5,671,160 | * | 9/1997 | Julian | 33/293 |
| 5,711,080 | * | 1/1998 | Yamada | 33/290 |
| 5,745,442 | * | 4/1998 | Herscher | 356/5.08 |
| 5,815,095 | * | 9/1998 | Yamamoto | 356/3 |
| 5,877,641 | * | 3/1999 | Ziegler et al. | 327/156 |
| 5,889,490 | * | 3/1999 | Wachter et al. | 342/127 |
| 5,949,548 | * | 9/1999 | Shirai et al. | 33/292 |
| 5,991,706 | * | 11/1999 | Tsukamoto et al. | 33/284 |
| 5,992,031 | * | 11/1999 | Shirai | 33/290 |

* cited by examiner

Primary Examiner—Christopher W. Fulton
Assistant Examiner—Quyen Doan
(74) Attorney, Agent, or Firm—Wagner , Murabito & Hao LLP (57) ABSTRACT

A distance interpolator incorporated into a total station and a method for digitally interpolating a distance measurement from the total station to a target, such that the distance interpolator measures the distance from the total station to the target using primarily digital electronics and statistical analysis. In one embodiment, the total station transmits an energy pulse from the electronic distance measuring portion of the total station, with the energy pulse directed at the target. This embodiment then receives at the electronic distance measuring portion the energy pulse reflected from the target. This embodiment also contains a reference oscillator and digital counter, which counts the number of reference oscillator clock pulses that elapse from the time the energy pulse is transmitted to the time the reflection of the energy pulse is received. This embodiment further accumulates counts for a number of additional energy pulses, and then calculates the average value of the counts over all energy pulses transmitted. This embodiment then calculates the distance between the total station and the target using the average value of the counts, the frequency of the reference oscillator, and the speed of light in the environment in which the counts were obtained.

17 Claims, 9 Drawing Sheets

INTERPOLATION USING DIGITAL MEANS FOR RANGE FINDINGS IN A TOTAL STATION

TECHNICAL FIELD

The present invention relates to survey instrumentation. In particular, the present invention pertains to a total station.

BACKGROUND ART

Modern total stations are typically required to electronically measure distances with an accuracy of five (5) mm or better. One method used to measure these distances is the time-of-flight method, where a short (<10 nano-seconds) pulse of light is emitted by the instrument, and a careful measurement is made of the time-of-flight between when the pulse leaves the instrument and when an echo pulse is received from the object to be measured.

The speed of light (which is 3×10^8 meters/second), coupled with the desire to measure distances to within 5 mm, leads to a requirement that the time-of-flight be measured with a precision of less than 40 pico-seconds. This, in turn, leads to a requirement in the hardware to either have a temperature-stable, precision reference oscillator with a frequency of 25 gigahertz (which is currently not practical), or a method of interpolating between the clock pulses of a slower reference oscillator.

In existing total stations using time-of-flight to measure distance, this interpolation is done by using a combination of analog and digital electronics to form time-to-voltage converters. A typical embodiment of these circuits is as follows.

Figure 1:
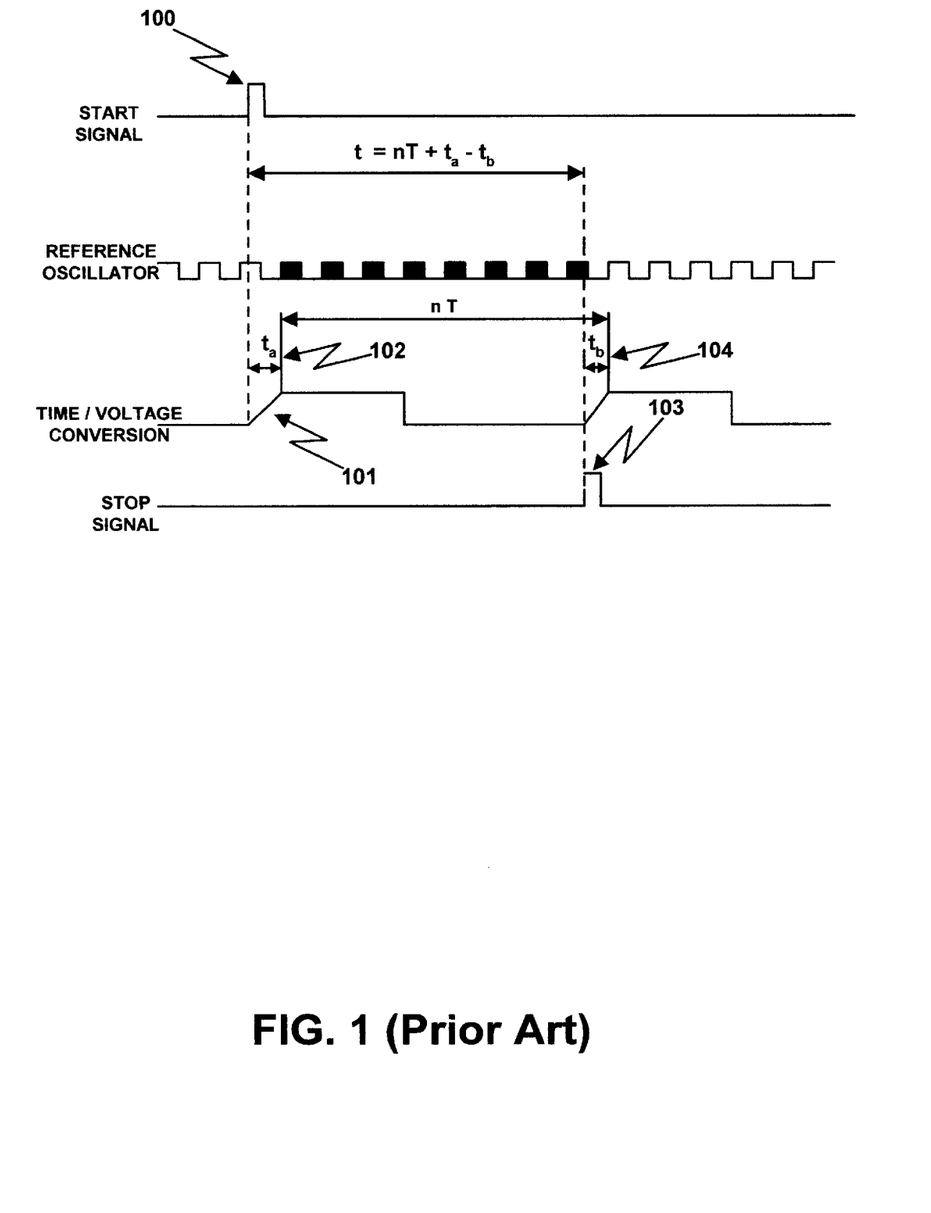
FIG. 1 is an illustration of a method for measuring time-of-flight of an energy pulse in accordance with a prior art total station.

Referring to Prior Art FIG. 1, the leading edge of start signal 100 activates a constant current charge cycle of a capacitor (not shown), leading to the voltage-versus-time ramp 101. The first leading edge of reference oscillator waveform 102 that occurs after this start signal terminates the charge cycle. The voltage across the capacitor is then amplified, converted using an analog-to-digital converter (not shown), and then further processed by a microprocessor (not shown). For reference purposes, the time represented by the voltage of this first ramp is called $t_A$.

The time between the leading edge of stop signal 103 and the next leading edge of the reference oscillator waveform that occurs after stop pulse 104 is then measured using a similar circuit. For reference purposes, the time represented by the voltage by this second ramp is called $t_B$.

The time of flight is then calculated as $nT+t_A-t_B$, where nT is defined as the number of rising edges of the reference oscillator that occurs between the rising edge of the start signal and rising edge of the stop signal multiplied by the period of the reference oscillator.

Variations of the circuit described above are possible, including (but not limited to):

using inductors rather than capacitors for the storage components, using current or voltage sources that are not constant, or otherwise generating ramps that do not increase linearly with time, or using the falling edges of the various waveforms or the center of the start and stop signals instead of their rising or falling edges.

However, all existing total stations doing time-of-flight measurements use some variation of this analog-based timing mechanism to interpolate the intervals between the clock pulses of the reference oscillator.

Because of the temperature-dependent and inherent unit-to-unit variations of the analog electronics used, extra analog and digital circuitry must also be provided in these circuits to measure and compensate for the temperature and unit-to-unit variations of the analog electronics.

Like all commercial products, there is an ongoing need in total stations to reduce the cost and increase the reliability of the system wherever possible. Thus, there is a need to eliminate the analog electronics and the digital electronics associated with them from the interpolation circuit.

DISCLOSURE OF THE INVENTION

The present invention provides a digital method of interpolating between the clock pulses used to measure the time of flight of a pulse of light, eliminating the costly and temperature-sensitive analog electronics currently used in similar total stations. The invention provides this functionality by accumulating and averaging the number of clock periods that elapse between the transmission of each pulse of light and the reception of its corresponding echo pulse over multiple pulses of light. The average value of clock periods obtained over the total number of pulses is equal to the interpolated value.

With the clock used to make the time-of-flight measurements operating asynchronously with the timing of the transmission of the light pulses, the resolution of the interpolated value is:

1/(Nf), where:

N=the number of light pulses averaged; and f=the frequency of the master clock.

These and other objects and advantages of the present invention will no doubt become obvious to those of ordinary skill in the art after having read the following detailed description of the preferred embodiments which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 2:
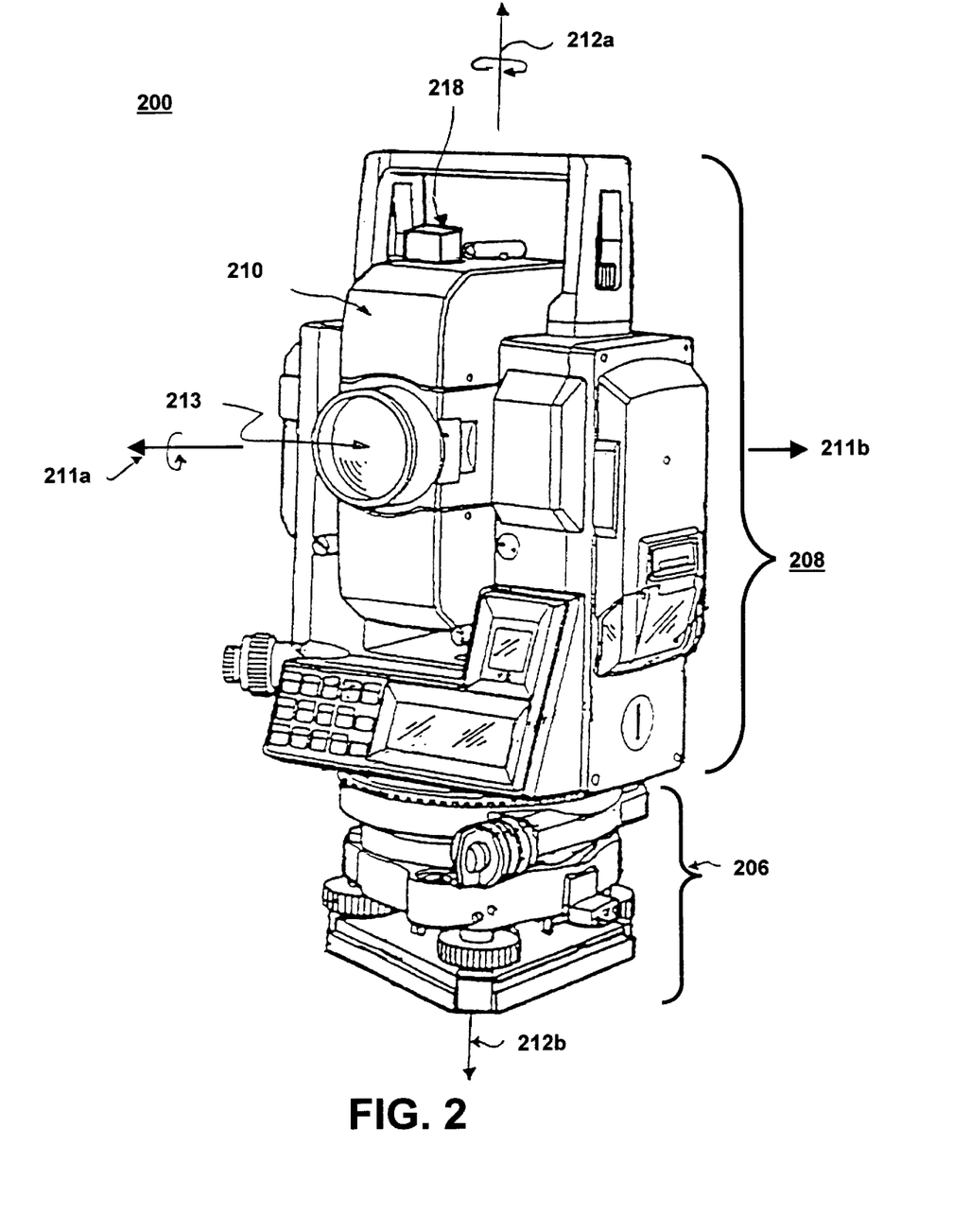
FIG. 2 is a perspective view of a total station in accordance with one embodiment of the present invention.

With reference now to FIG. 2, a perspective view of one embodiment of a total station used in accordance with the present invention is shown. Total station 200 is comprised of base portion 206, rotational alidade portion 208, and electronic distance measuring portion 210. Rotational alidade portion 208 rotates on base portion 206 about the vertical central axis represented by arrows 212a and 212b. That is, rotational alidade portion 208 is able to rotate 360 degrees on base 206.

Electronic distance measuring portion 210 then rotates within rotational alidade portion 208 about a horizontal axis represented by arrows 211a and 211b. Given the rotation of the electronic distance measuring portion 210 around axis 211 and the rotation of rotational alidade portion 208 around axis 212, it is possible to point electronic distance measuring portion 210 at any target so that the distance between the instrument and the target can be measured.

Electronic distance measuring portion 210 transmits energy pulses (not shown) that are directed at a target through lens 213. These energy pulses are reflected by the target and then received back at electronic distance measuring portion 210 through lens 213. In another embodiment, energy pulses are received by a second, receive-only lens mounting in electronic distance measuring portion 210.

With reference still to FIG. 2, in the present invention, electronic distance measuring portion 210 is equipped with distance interpolator 218. Distance interpolator 218 is coupled to a reference oscillator (not shown) that in the present embodiment is integral to electronic distance measuring portion 210. In the present embodiment, the reference oscillator generates clock pulses at a fixed frequency. In the present embodiment, the clock pulses are generated concurrently with but independently of the energy pulses transmitted by electronic distance measuring portion 210.

Figure 3:
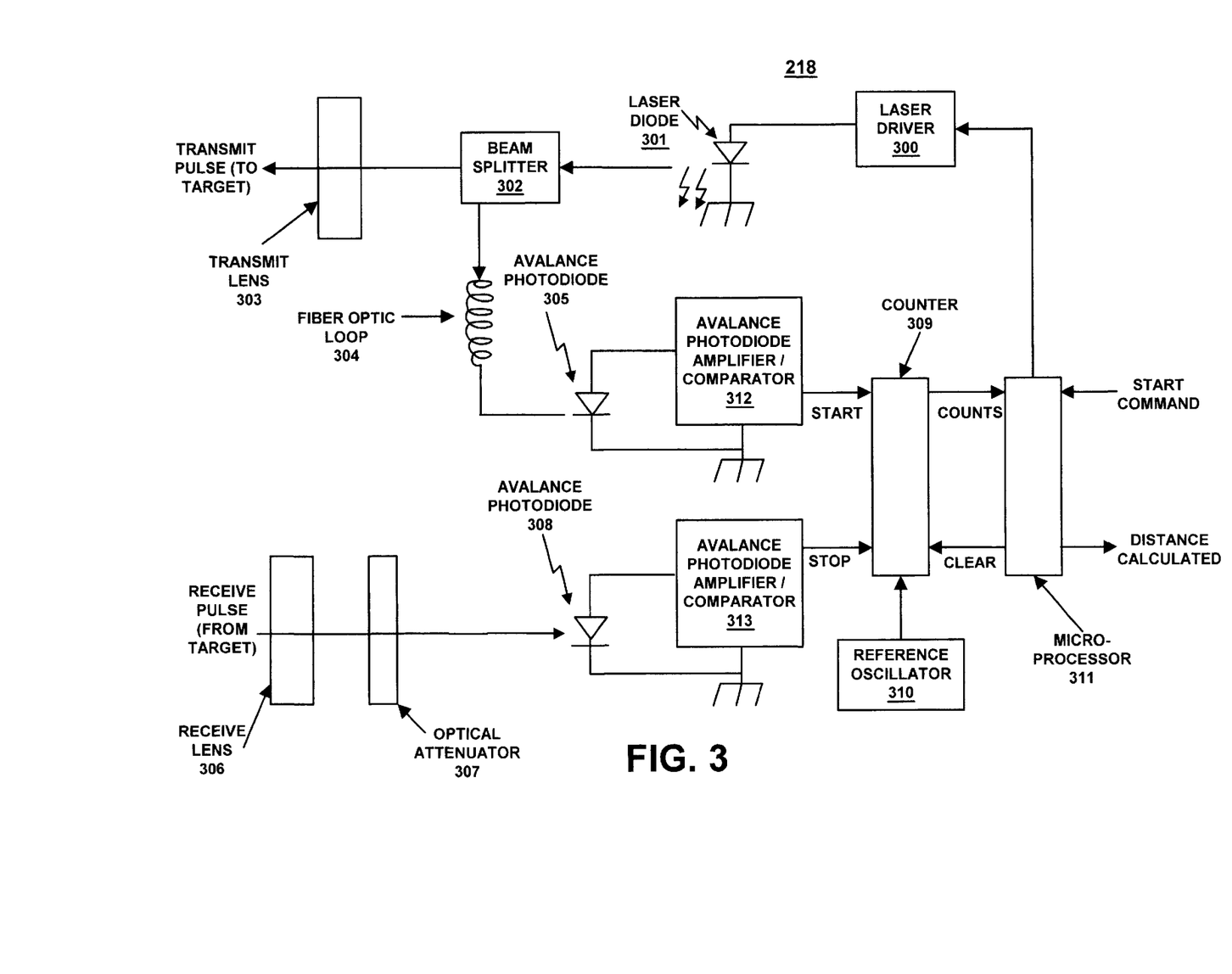
FIG. 3 is a block diagram illustrating one embodiment of the present invention.

FIG. 3 shows the block diagram of one embodiment of the present invention distance interpolator 218 in a time-of-flight-based electronic distance measuring unit. In FIG. 3, energy pulses are generated when microprocessor 311 commands laser driver 300 to trigger laser diode 301. A portion of the light generated by laser diode 301 is split off from the main beam with beam splitter 302, while the remainder of the energy produced by laser diode 301 is transmitted out transmit lens 303.

The portion of the light that is split away using beam splitter 302 is delayed using fiber optic loop 304, then detected and amplified using avalanche-photodiode 305 and its associated avalanche-photodiode amplifier/comparator 312. The output of avalanche-photodiode amplifier/comparator 312 is used to start the accumulation of counts in counter 309.

The returning (echo) pulse from the target is received through receive lens 306, then attenuated as necessary through optical attenuator 307 so as to insure the signal will stay within the linear region of avalanche photodiode 308 and its associated amplifier/comparator 313. The output of avalanche photodiode 308 and its associated amplifier/comparator 313 are used to stop the accumulation of counts in counter 309.

Reference oscillator 310 is used to clock counter 309 when it is counting (i.e., during the intervals between the start pulses generated by avalanche-photodiode amplifier/comparator 312 and the stop pulses generated by avalanche-photodiode-amplifier/comparator 313).

At any given time, microprocessor 311 can retrieve the total number of counts from counter 309. Since microprocessor 311 also controls the number of pulses over which counts are accumulated, it can calculate the average number of counts per pulse. Microprocessor 311 can also clear the counter whenever a new measurement is desired. Thus, the microprocessor has control over the number of pulses over which the data is averaged.

In the present embodiment, the number of pulses over which the data is averaged would be a power of two (2), such that averaging can be done by simply ignoring the number of least significant bits equal to the power to which 2 was raised.

Figure 4A:
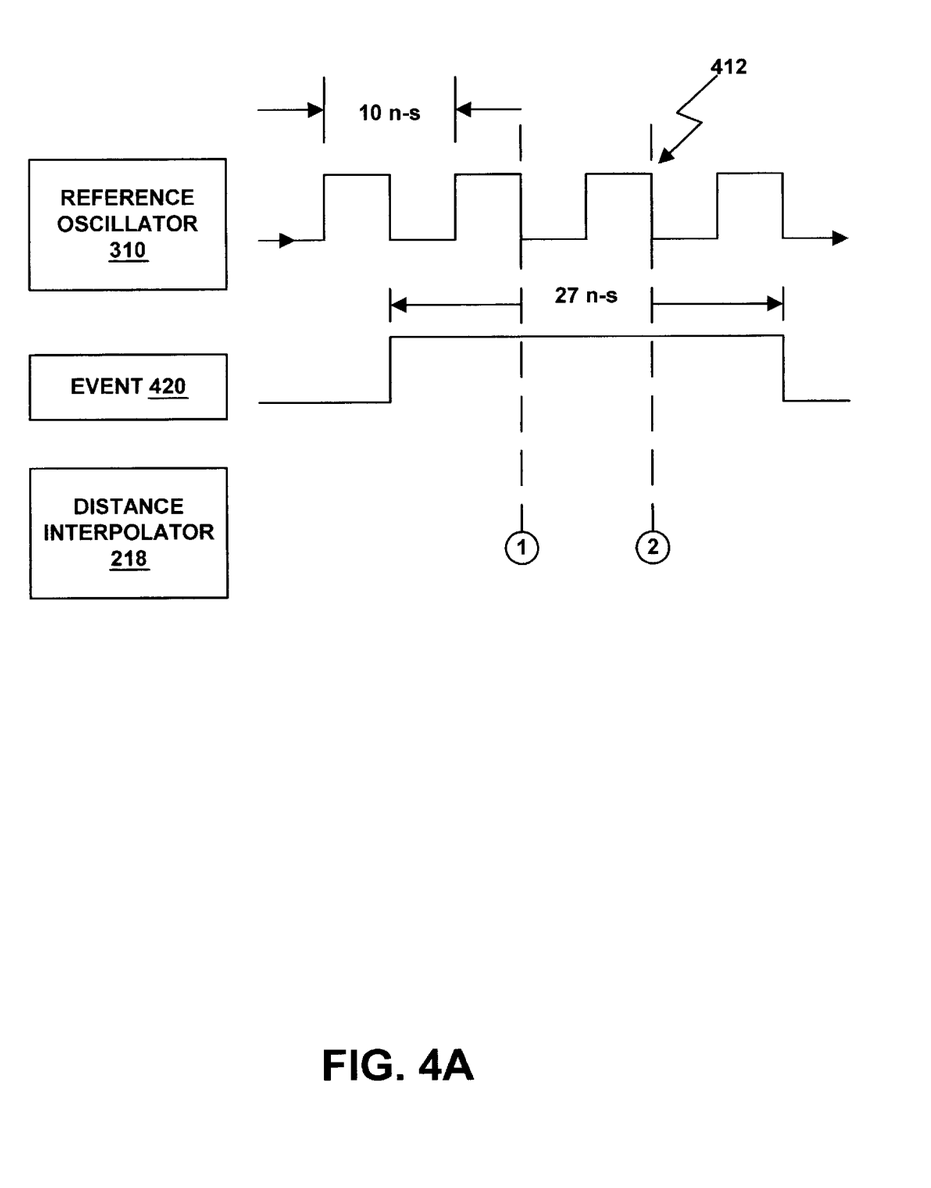
FIGS. 4A and 4B are illustrations of an example measurement of the length of time of an event in accordance with one embodiment of the present invention.
Figure 4B:
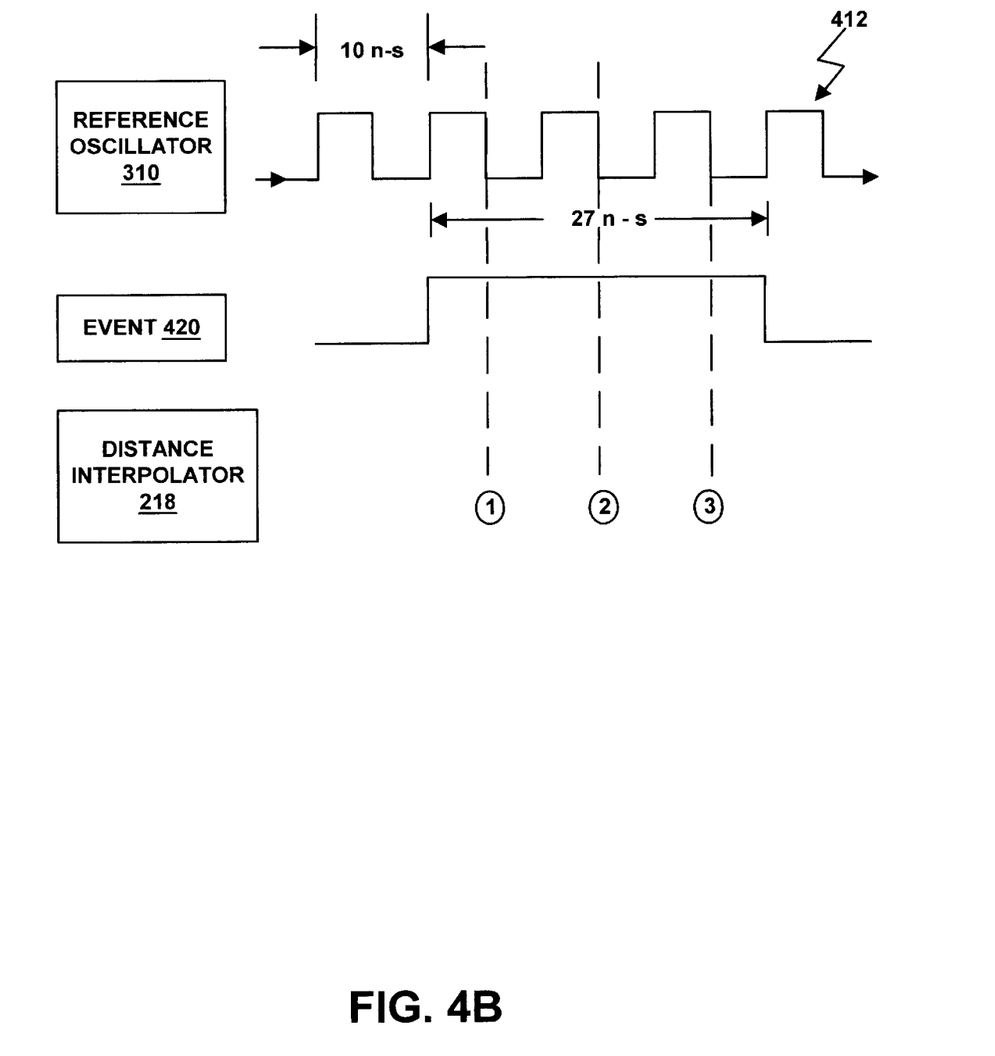

With reference now to FIGS. 4A and 4B, the digital methodology employed by the present invention distance interpolator is described for the case in which the length of time of a single event is measured. Reference oscillator 310 generates clock pulses 412. For the example provided by FIGS. 4A and 4B, reference oscillator 310 is a 100 MHz reference oscillator; that is, the time base period of each of clock pulses 412 is 10 nano-seconds in length.

Continuing with reference to FIGS. 4A and 4B, an event to be timed, such as the width of an energy pulse, is exemplified by event 420, which is 27 nano-seconds in length. Reference oscillator 310 generates clock pulses 412 concurrent with but independent of event 420. Distance interpolator 218 determines a count of the clock pulses that occur during event 420. In the embodiment illustrated by this example, distance interpolator 218 counts the falling edge of each clock pulse. However, in other embodiments, the distance interpolator could instead count the rising edge of each clock pulse.

With reference now to FIG. 4A, during a first measurement of event 420, two (2) falling edges of clock pulses 412 occur. With reference now to FIG. 4B, during a second measurement of event 420, three (3) falling edges of clock pulses 412 occur. The number of clock pulses that occur during the two separate measurements is different because the reference oscillator generates clock pulses independent of the event. Event 420 is repeated and measured a selected number of times determined by the user of the total station. In the example of FIGS. 4A and 4B, subsequent measurements of event 420 will result in a count of either 2 or 3 clock pulses. In this embodiment, the present invention distance interpolator then determines the mean of the counts of the clock pulses for the selected number of measurements performed. In the example of FIGS. 4A and 4B, the mean of the two measurements is 2.5 clock pulses, or 25 nano-seconds.

With reference still to FIGS. 4A and 4B, because the clock pulses are independent of the event, the statistical probability of counting 3 clock pulses is greater than the statistical probability of counting 2 clock pulses. Hence, as more measurements are performed, the mean of the count of clock pulses will asymptotically approach the actual event length of 2.7 clock pulses, or 27 nano-seconds. Thus, in the manner described above, the present invention digitally determines event length and performs a digital interpolation between clock pulses, instead of using the analog methodology utilized in the prior art.

Figure 5A:
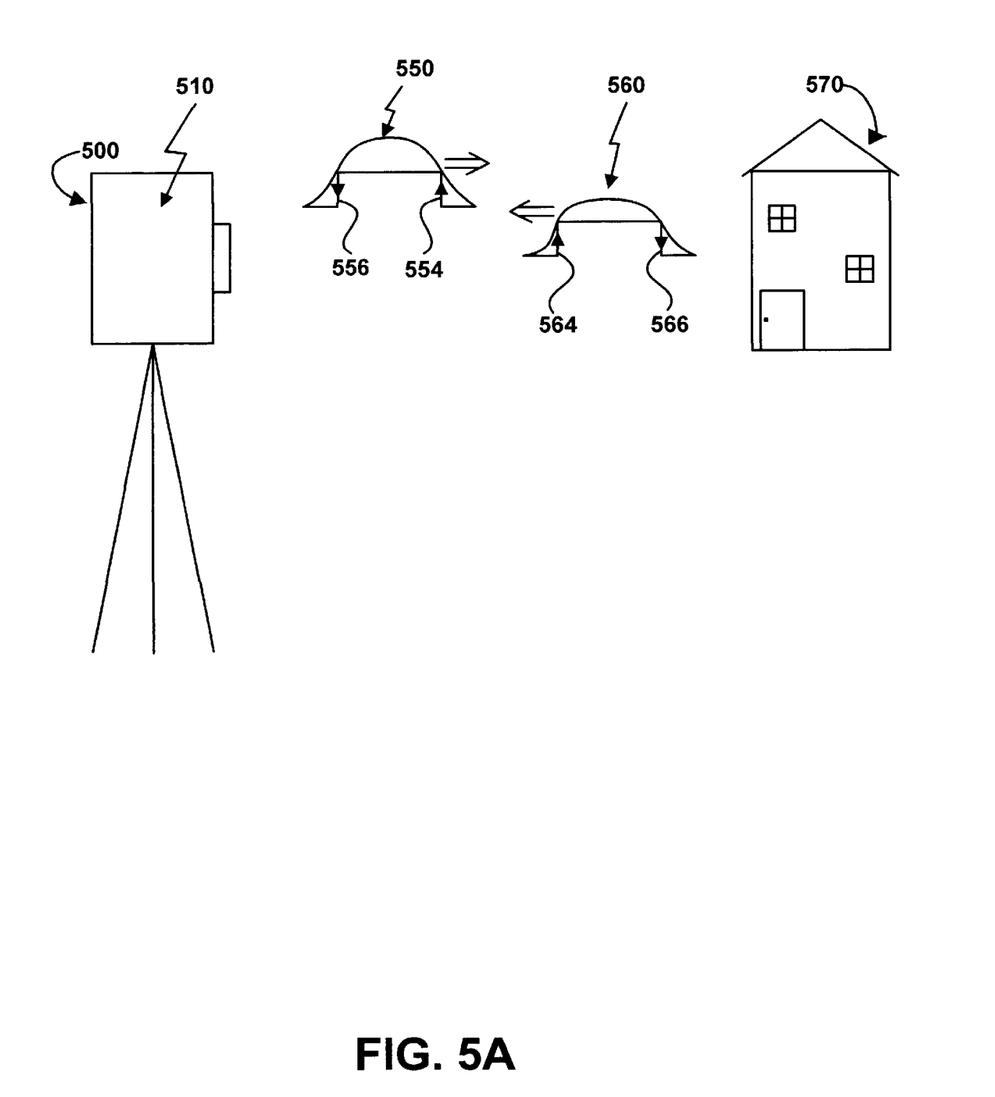
FIGS. 5A and 5B are illustrations of the use of an energy pulse to measure distance in accordance with one embodiment of the present invention.
Figure 5B:
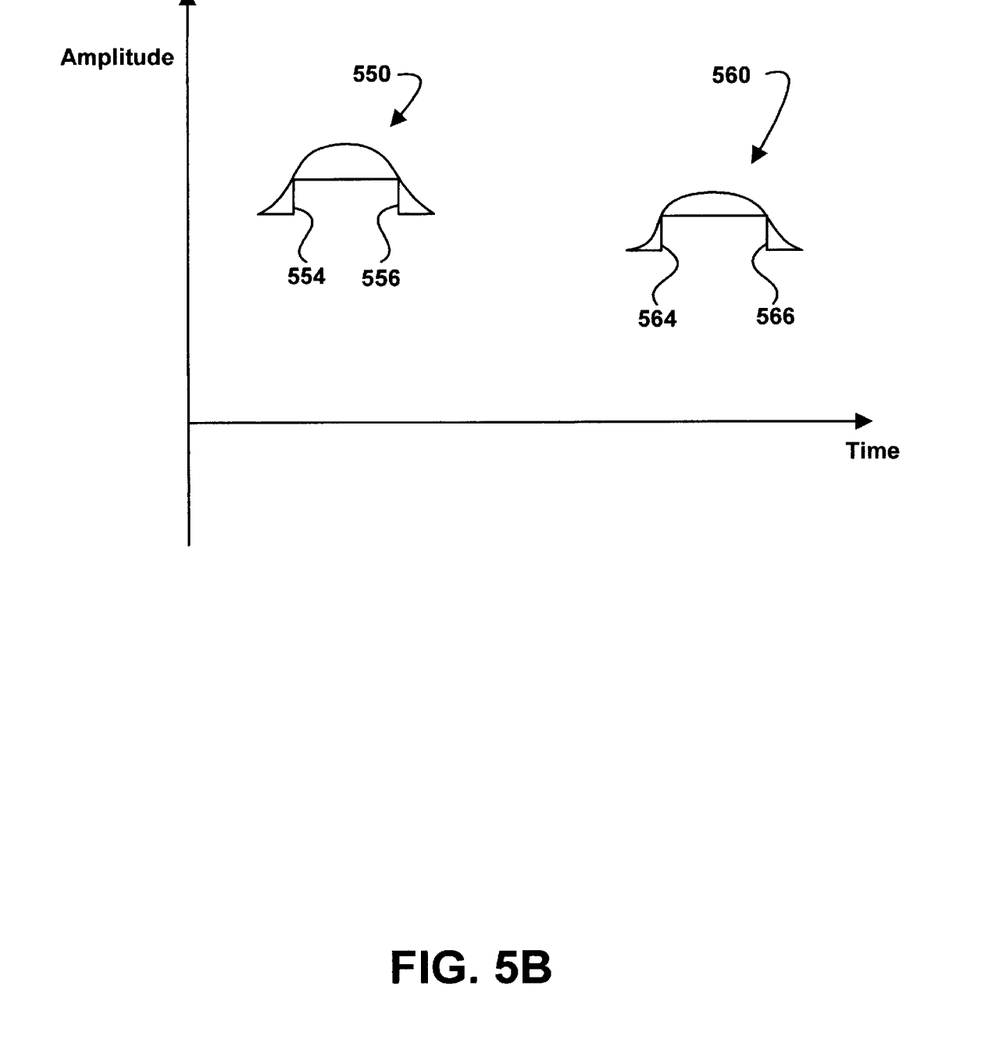

With reference now to FIGS. 5A and 5B, the digital methodology employed by the present invention distance interpolator is described for the case in which the time-of-flight of an energy pulse is measured. In FIG. 5A, a total station 500, specifically electronic distance measuring portion 510, transmits energy pulse 550 out to target 590, which is reflected off of target 590 and then received by electronic distance measuring portion 510. Due to the reflection off the target, return energy pulse 560 returning from target 590 may have different characteristics than transmitted energy pulse 550, i.e., the return energy pulse may have a different amplitude or wave length than the transmitted energy pulse. A comparator (not shown) is used to square off the transmitted energy pulse and the return energy pulse.

With continued reference to FIG. 5A, a signal is generated in electronic distance measuring portion 510 by rising edge 554 of transmitted energy pulse 550. A signal is also generated in electronic distance measuring portion 510 by falling edge 556 of transmitted energy pulse 550. After reflection off of target 590, return energy pulse 560 is received by electronic distance measuring portion 510. As above, rising edge 564 and falling edge 566 each generate a to signal by electronic distance measuring portion 510. The signals generated by electronic distance measuring portion 510 are used to identify a start time at the beginning of an interval and a stop time at the end of an interval during which a count of clock pulses is to be taken. The signal identifying the stop time for one interval also identifies the start time for an interval immediately following if there is a need for such an interval.

With reference now to FIG. 5B, in this embodiment the time-of-flight of an energy pulse is measured by first counting the clock pulses generated by the reference oscillator during each of the intervals defined by the start and stop signals generated in the electronic distance measuring portion. That is, the clock pulses that occur between rising edge 554 and falling edge 556, between falling edge 556 and rising edge 564, and between rising edge 564 and falling edge 566, are counted. Then, time-of-flight measurements are made for additional energy pulses and accumulated by the distance interpolator for each of the intervals defined by the start and stop signals. Then, as described in conjunction with FIG. 4, the distance interpolator calculates the mean of the accumulated counts of the clock pulses for each of the intervals.

Figure 6A:
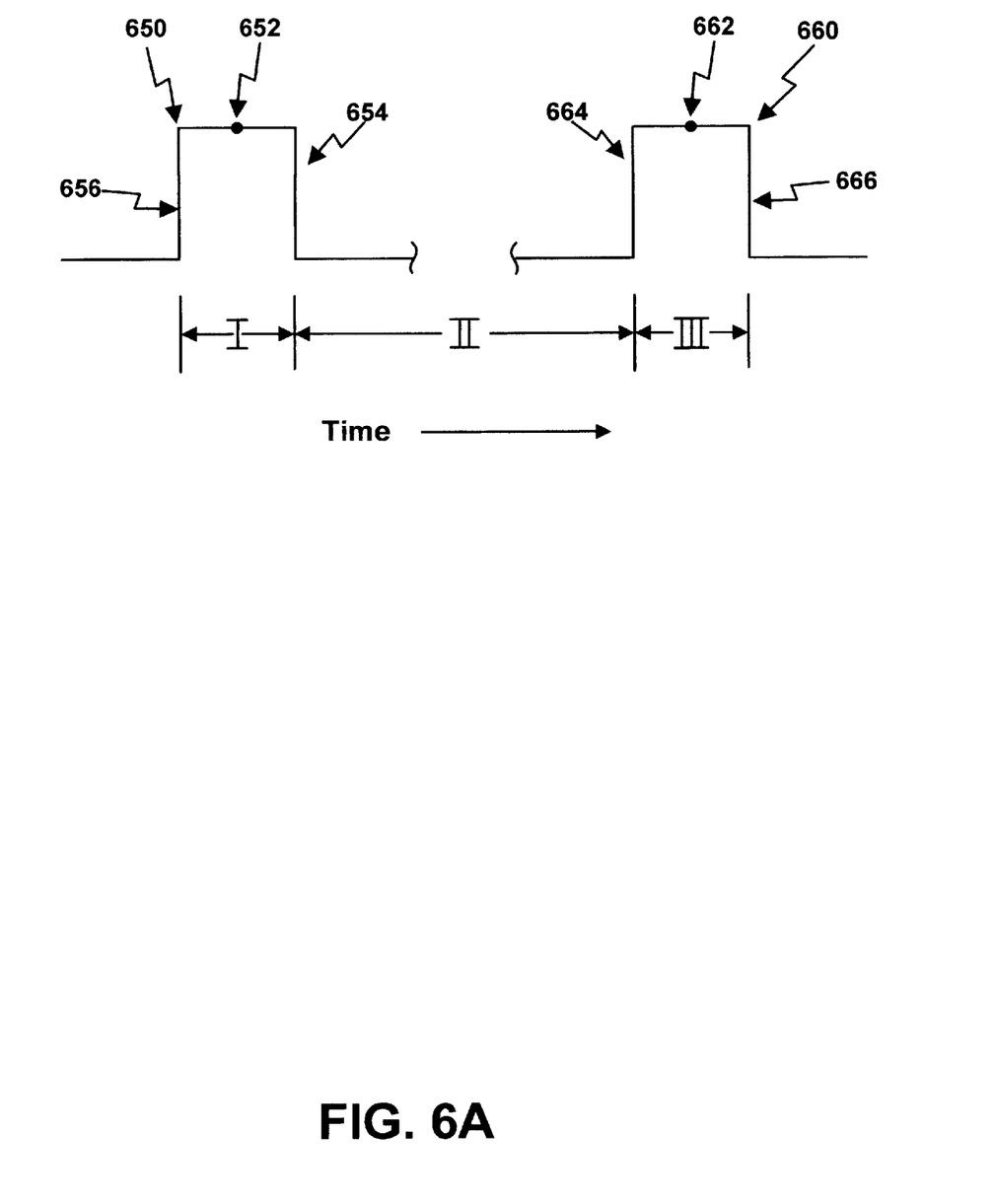
FIGS. 6A and 6B are illustrations of example measurements of time-of-flight of an energy pulse in accordance with different embodiments of the present invention.
Figure 6B:
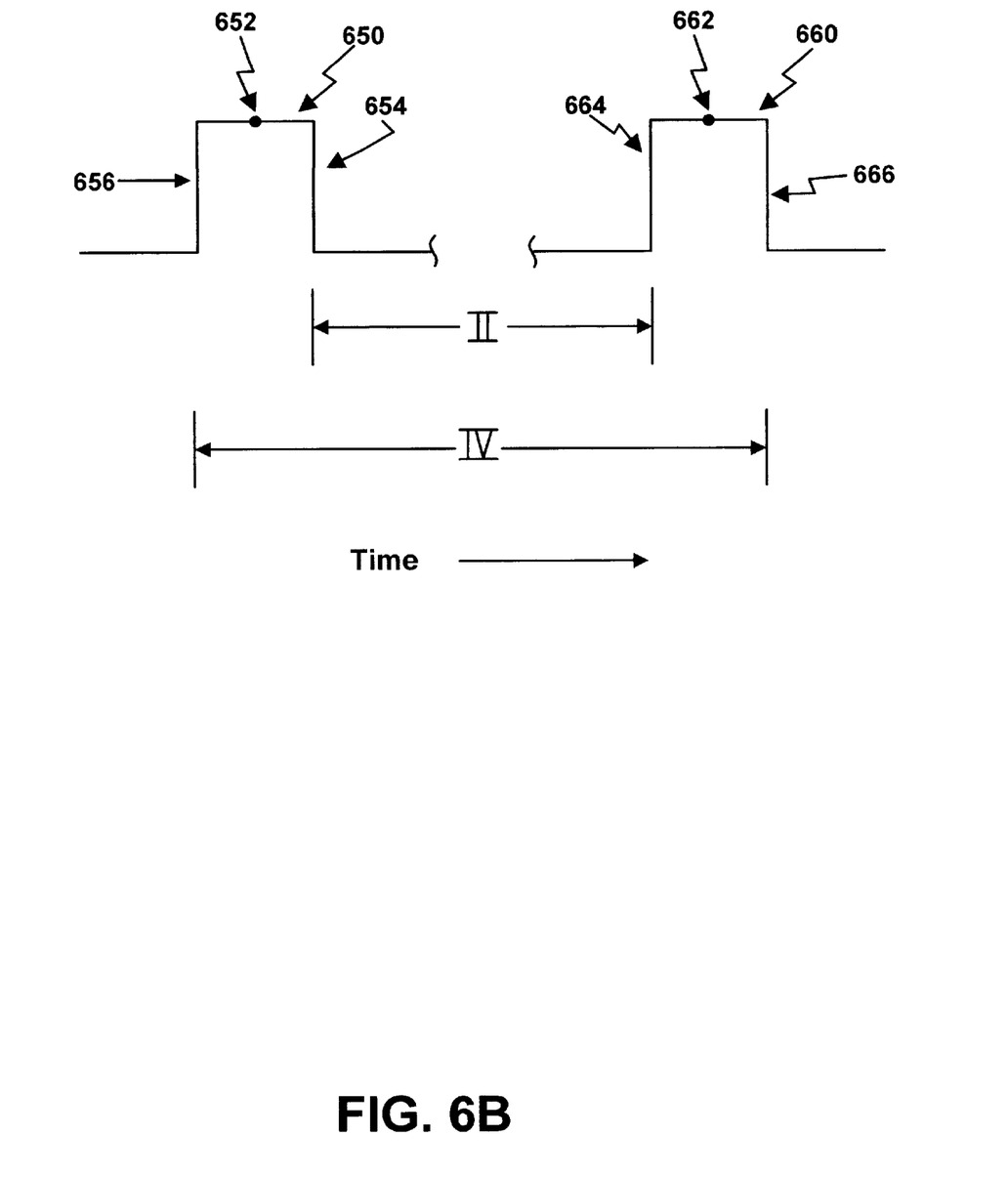

With reference now to FIGS. 6A and 6B, transmitted energy pulse 650 and return energy pulse 660 are both placed on the same time line. With reference first to FIG. 6A, in one embodiment of the present invention the start and stop signals generated by the electronic distance measuring portion based on the rising and falling edges of the transmitted and return energy pulses (indicated by 654, 656, 664 and 666) are used to define intervals I, II and III. Then, for each of the intervals I, II and III, the present invention distance interpolator (not shown) makes a count of the clock pulses for each energy pulse transmitted by the electronic distance measuring portion for the period of time that the energy pulse is passing through each interval. That is, for each energy pulse, in this embodiment the distance interpolator makes a count of the clock pulses for interval I, a separate count of the clock pulses for interval II, and another separate count of the clock pulses for interval III. In this manner, in this embodiment the time-of-flight of an energy pulse through each interval I, II and III is determined. The time-of-flight measurements through each interval I, II and III are repeated for the selected number of different energy pulses and accumulated by the distance interpolator. In this embodiment, the means of the time-of-flight measurements for each interval I, II and III are then also determined by the distance interpolator, in the manner previously discussed; that is, a mean is determined for interval I, for interval II, and for interval III.

Continuing with reference to FIG. 6A, the sum of the mean for interval I, twice the mean for interval II, and the mean for interval III, this sum then divided by two, yields the digitally interpolated time interval from mid-point 652 of transmitted energy pulse 650 to mid-point 662 of return energy pulse 660. The digitally interpolated time interval from mid-point 652 to mid-point 662 is used to determine the distance between the total station and the target, by multiplying by the known travel speed of the energy pulses. In this manner, this embodiment of the present invention digitally determines the time-of-flight of an energy pulse used to measure distance in a total station, and digitally interpolates between clock pulses to more precisely measure distance.

With reference now to FIG. 6B, another embodiment of the present invention counts clock pulses for each energy pulse in the same manner as described above, but in this case for intervals II and IV. As above, in this embodiment the clock pulses are counted for each interval for the selected number of energy pulses, and the means determined for each interval. The sum of the means for interval II and for interval IV, this sum then divided by two, yields the total time interval for the interval from mid-point 652 of transmitted energy pulse 650 to mid-point 662 of return energy pulse 660 and, as above, the distance from the total station to the target. In this manner, one embodiment of the present invention digitally determines the time-of-flight of an energy pulse used to measure distance in a total station, and digitally interpolates between clock pulses to more precisely measure distance.

It is appreciated that in other embodiments of the present invention, the count of the clock pulses for each interval is digitally determined in different manners. For example, other embodiments of the present invention may first sum the clock pulses for each interval being measured for each energy pulse, then determine the mean of the sums.

Further variations are possible as to whether counting starts on the leading edge, the trailing edge, or some point in between within the transmit pulse, as well as whether counting stops on the leading edge, the trailing edge, or some point in between within the received pulse.

The present embodiment can also be modified to accommodate counting the intervals between the centers of the two waveforms as follows: by accumulating and averaging the intervals from the leading edge of the start pulse to the trailing edge of the stop pulse, and simultaneously accumulating and averaging in a second counter the intervals from the trailing edge of the start pulse to the leading edge of the stop pulse, the average interval between the center point of the pulses can be calculated as the average of the two intervals (that is, the values of the two intervals are digitally added and then divided by two).

Note that this invention can be used to time intervals shorter than the period of the reference oscillator.

In summary, the present invention digitally determines the time-of-flight of the energy pulse used by the total station to measure distance to a target, and digitally interpolates between clock pulses in order to more precisely determine the distance. As such, the present invention addresses the disadvantages of the prior art with regard to the inaccuracies introduced due to uncertainties from temperature effects. The present invention also eliminates the need for the extra analog and digital circuitry used in the prior art to measure and compensate for the temperature and unit-to-unit variations of the analog electronics. Thus, the present invention reduces production and material costs and also eliminates the need to calibrate these devices. The digital methodology of the present invention also reduces the complexity of the time-of-flight measurement.

The present invention thus provides a total station that precisely measures the distance from the total station to a target. The present invention also provides a total station that achieves the above and also addresses the issues regarding temperature-dependence and calibration. The present invention further provides a total station that is reliable, cost-effective and user-friendly.

The preferred embodiment of the present invention, interpolation using digital means for range findings in a total station, is thus described. While the present invention has been described in particular embodiments, it should be appreciated that the present invention should not be construed as limited by such embodiments, but rather construed according to the following claims.

What is claimed is:

1. A measurement apparatus comprising:
   a total station, said total station further comprising:
   a rotational alidade portion,
   an electronic distance measuring portion coupled to said rotational alidade portion, said electronic distance measuring portion adapted to transmit an energy pulse directed at a target and to receive said energy pulse reflected from said target,
   a distance interpolator coupled to said electronic distance measuring portion, said distance interpolator adapted to digitally interpolate between distance measurements obtained using said total station such that said total station more precisely measures distance from said total station to said target, and
   a reference oscillator coupled to said electronic distance measuring portion, said reference oscillator adapted to generate a plurality of clock pulses independent of said energy pulse, wherein said plurality of clock pulses are for measuring time of flight of said energy pulse.

2. The measurement apparatus of claim 1 wherein said electronic distance measuring portion is adapted to generate a signal at a start time when a count of said plurality of clock pulses is to begin, and to generate a signal at a stop time when a count of said plurality of clock pulses is to end.

3. The measurement apparatus of claim 2 wherein said electronic distance measuring portion is adapted to generate a signal when a rising edge of an energy pulse is transmitted by said electronic distance measuring portion.

4. The measurement apparatus of claim 2 wherein said electronic distance measuring portion is adapted to generate a signal when a falling edge of an energy pulse is transmitted by said electronic distance measuring portion.

5. The measurement apparatus of claim 2 wherein said electronic distance measuring portion is adapted to generate a signal when a rising edge of an energy pulse is received by said electronic distance measuring portion.

6. The measurement apparatus of claim 2 wherein said electronic distance measuring portion is adapted to generate a signal when a falling edge of an energy pulse is received by said electronic distance measuring portion.

7. The measurement apparatus of claim 2 wherein said distance interpolator is adapted to count said plurality of clock pulses generated between said start time and said stop time.

8. The measurement apparatus of claim 2 wherein said distance interpolator is adapted to determine a count of rising edges of said plurality of clock pulses.

9. The measurement apparatus of claim 2 wherein said distance interpolator is adapted to determine a count of the falling edges of said plurality of clock pulses.

10. The measurement apparatus of claim 2 wherein said distance interpolator is adapted to determine a count of said plurality of clock pulses for each of a selected number of different energy pulses.

11. The measurement apparatus of claim 10 wherein said distance interpolator is adapted to determine the mean of said count of said plurality of said clock pulses for said selected number of different energy pulses.

12. In a total station, a method for digitally interpolating a distance measurement from a total station to a target such that said total station more precisely measures distance from said total station to said target, said method comprising the steps of:
   a) transmitting an energy pulse from an electronic distance measuring portion of said total station, said energy pulse directed at said target;
   b) receiving at said electronic distance measuring portion said energy pulse reflected from said target;
   c) generating a plurality of clock pulses, said plurality of clock pulses generated by a reference oscillator, wherein said plurality of clock pulses are generated independent of said energy pulse, and wherein said plurality of clock pulses are for measuring time of flight of said energy pulse;
   d) determining a count of said plurality of clock pulses between a start time when said count of said plurality of clock pulses is to start, and a stop time when said count of said plurality of clock pulses is to stop, said start time and said stop time corresponding to said energy pulse;
   e) determining said count of said plurality of clock pulses between said start time and said stop time for each of a selected number of different energy pulses; and
   f) calculating the mean of said count of said plurality of clock pulses for said selected number of different energy pulses.

13. The method as recited in claim 12 wherein step a) further comprises the steps of:
   a1) generating a signal when a rising edge of said energy pulse is transmitted from said electronic distance measuring portion; and
   a2) generating a signal when a falling edge of said energy pulse is transmitted from said electronic distance measuring portion.

14. The method as recited in claim 12 wherein step b) further comprises the steps of:
   b1) generating a signal when a rising edge of said energy pulse reflected from said target is received at said electronic distance measuring portion; and
   b2) generating a signal when a falling edge of said energy pulse reflected from said target is received at said electronic distance measuring portion.

15. The method as recited in claim 12 wherein step c) further comprises generating said plurality of clock pulses at a fixed frequency.

16. The method as recited in claim 12 wherein step d) further comprises determining a count of rising edges of said plurality of clock pulses.

17. The method as recited in claim 12 wherein step d) further comprises determining a count of falling edges of said plurality of clock pulses.

* * * * *